US012297722B2

(12) United States Patent
Shahzad et al.

(10) Patent No.: US 12,297,722 B2
(45) Date of Patent: May 13, 2025

(54) TOTAL CRUDE OIL DEMAND CONTROL FROM MULTIPLE OIL STABILIZER COLUMNS

(71) Applicant: Saudi Arabian Oil Company, Dhahran (SA)

(72) Inventors: Rana Khurram Shahzad, Abqaiq (SA); Ali A. Alwadi, Dammam (SA); Mohammed Al-Saeed, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 642 days.

(21) Appl. No.: 17/591,722

(22) Filed: Feb. 3, 2022

(65) Prior Publication Data

US 2023/0279751 A1    Sep. 7, 2023

(51) Int. Cl.
*E21B 43/12*      (2006.01)
*B01J 19/00*     (2006.01)
*G05B 15/02*     (2006.01)

(52) U.S. Cl.
CPC .......... *E21B 43/12* (2013.01); *B01J 19/0006* (2013.01); *B01J 19/0033* (2013.01); *G05B 15/02* (2013.01);
(Continued)

(58) Field of Classification Search
CPC .......... E21B 43/12; E21B 41/00; E21B 43/00; E21B 2200/20; E21B 2200/22;
(Continued)

(56) References Cited

U.S. PATENT DOCUMENTS 5,001,346 A    3/1991   Barkhoudarian
6,157,033 A   12/2000   Chudnovsky
(Continued)

FOREIGN PATENT DOCUMENTS

CA   2823242 A1 *  7/2012  ......... B01D 53/1468
EP   0632259         1/1995
(Continued)

OTHER PUBLICATIONS

SAIP Examination Report in Saudi Arabian Appln. No. 123441145, dated Aug. 29, 2024, 16 pages, (with English Translation).
(Continued)

*Primary Examiner* — Randy Boyer
*Assistant Examiner* — Juan C Valencia
(74) *Attorney, Agent, or Firm* — Fish & Richardson P.C.

(57) ABSTRACT

Systems and methods include a computer-implemented method for managing crude oil demand at a crude oil processing plant. Real-time process data is received for the plant and includes quantitative values for conditions and operations at the plant. A multiple stabilizer oil flow control strategy is determined for crude oil stabilizer columns of the plant using the real-time process data. A targeted oil flow rate is determined for each stabilizer column using the strategy. The targeted oil flow rate provides a continuous and on-target crude oil supply to components of the plant in multiple operating scenarios. The on-target crude oil supply includes a range of oil flow volumes required for continuous operation. The plant is operated using the strategy, including maintaining, using the targeted oil flow rate for each stabilizer column, crude oil demand for different combinations of the crude oil stabilizer columns and multiple operating scenarios.

20 Claims, 6 Drawing Sheets

(52) U.S. Cl.
CPC .......... *B01J 2219/00049* (2013.01); *B01J 2219/00164* (2013.01); *B01J 2219/00229* (2013.01)

(58) Field of Classification Search
CPC .......... B01J 19/0006; B01J 19/0033; B01J 2219/00049; B01J 2219/00164; B01J 2219/00229; G05B 15/02; C10G 7/02; C10G 7/12; G05D 7/0682; B01D 3/42; B01D 3/14
See application file for complete search history.

(56) References Cited

U.S. PATENT DOCUMENTS

| | | | |
|---|---|---|---|
| 6,866,089 | B2 | 3/2005 | Avila |
| 7,649,174 | B2 | 1/2010 | Mammen et al. |
| 7,925,387 | B2 | 4/2011 | Zheng et al. |
| 8,085,301 | B2 | 12/2011 | Hill, Jr. et al. |
| 8,134,127 | B2 | 3/2012 | Hill, Jr. |
| 8,250,006 | B2 | 8/2012 | Smits et al. |
| 8,429,100 | B2 | 4/2013 | Jang et al. |
| 8,572,155 | B2 | 10/2013 | Yanovich et al. |
| 8,659,664 | B2 | 2/2014 | Benson et al. |
| 8,869,890 | B2 | 10/2014 | Chinn et al. |
| 9,383,262 | B2 | 7/2016 | Stratmann |
| 9,726,543 | B2 | 8/2017 | Zeng |
| 11,078,428 | B2 | 8/2021 | Lee et al. |
| 2005/0126263 | A1 | 6/2005 | Avila |
| 2010/0230593 | A1 | 9/2010 | Hill, Jr. |
| 2010/0242362 | A1 | 9/2010 | Van Amelsvoort et al. |
| 2011/0054703 | A1 | 3/2011 | Heavner, III |
| 2011/0295777 | A1 | 12/2011 | Jang et al. |
| 2013/0201025 | A1 | 8/2013 | Kamalakannan et al. |
| 2014/0214733 | A1 | 7/2014 | Alonso et al. |
| 2015/0184932 | A1 | 7/2015 | Higginbotham et al. |
| 2016/0110973 | A1 | 4/2016 | Cho et al. |
| 2017/0097330 | A1 | 4/2017 | Mann |
| 2017/0121610 | A1 | 5/2017 | Niccum et al. |
| 2017/0269559 | A1 | 9/2017 | Trygstad et al. |
| 2018/0187095 | A1 | 7/2018 | Solliman et al. |
| 2018/0188163 | A1 | 7/2018 | Kester et al. |
| 2019/0003984 | A1 | 1/2019 | Kester et al. |
| 2019/0040323 | A1 | 2/2019 | Lee et al. |
| 2019/0105602 | A1 | 4/2019 | Bhuwania et al. |
| 2019/0373185 | A1 | 12/2019 | Kester et al. |
| 2020/0072671 | A1 | 3/2020 | Kester et al. |
| 2020/0088586 | A1 | 3/2020 | Kester et al. |
| 2020/0124470 | A1 | 4/2020 | Kester et al. |
| 2020/0124525 | A1 | 4/2020 | Kester et al. |
| 2020/0128196 | A1 | 4/2020 | Kester et al. |
| 2020/0132596 | A1 | 4/2020 | Kester et al. |
| 2020/0165528 | A1 | 5/2020 | Nanda et al. |
| 2020/0264149 | A1 | 8/2020 | Kester et al. |
| 2020/0362694 | A1* | 11/2020 | Al-Rubaii .......... E21B 21/08 |

FOREIGN PATENT DOCUMENTS

| | | |
|---|---|---|
| EP | 2942615 | 11/2015 |
| EP | 2955496 | 12/2015 |
| EP | 3707497 | 11/2017 |
| EP | 3676597 | 7/2020 |
| KR | 100994308 | 11/2010 |
| SU | 1454826 | 1/1989 |
| SU | 1454826 A1 * | 1/1989 |

OTHER PUBLICATIONS

Asirvadam et al., "Risk map for video surveillance CCTV," 2014 5th International Conference on Intelligent and Advanced Systems (ICIAS), IEEE, Jun. 2014, 7 pages.

Deng et al., "Development and industrial application of soft sensors with on-line Bayesian model updating strategy," Journal of Process Control 2013, 23: 317-325, 9 pages.

Fayruzov et al., "Advanced process control system for a crude distillation unit. A case study," Automation and Remote Control, Plenum, Publ. Co, Feb. 12, 2017, 78:2, 11 pages.

Ge et al., "A comparative study of just-in-time-learning based methods for online soft sensor modeling," Chemometrics and Intelligent Laboratory Systems, 2010, 104: 306-317, 12 pages.

Gonzaga et al., "ANN-based soft-sensor for real-time process monitoring and control of an industrial polymerization process," Computers and Chemical Engineering, 2009, 33: 43-49, 7 pages.

Kadlec et al., "Data-driven Soft Sensors in the process industry," Computers and Engineering, 2009, 33: 795-814, 20 pages.

Kano et al., "Inferential control system of distillation compositions using dynamic partial least squares regression," Journal of Process Control, 2000, 10: 157-166, 10 pages.

Lee et al., "Employing First Principles Model-Based Soft Sensors for Superior Process Control and Optimization," IPTC 16604, IPTC International Petroleum Technology Conference, 2013, 4, 4 pages.

RebellionPhotonics.com [online], "Mini GCI Camera" Feb. 2020, [retrieved on Sep. 17, 2020], retrieved from: URL <https://d1mzel9rllklzx.cloudfront.net/products/rebellion-photonics-gci/Mini-GCI-Datasheet.pdf?mtime=20200212093928&focal=none>, 1 page.

RebellionPhotonics.com [online], "Standard GCI Camera" Feb. 2020, [retrieved on Sep. 17, 2020], retrieved from: URL <https://d1mzel9rllklzx.cloudfront.net/products/rebellion-photonics-gci/Standard-GCI-Datasheet.pdf?mtime=20200212093941&focal=none>, 1 page.

Somov et al. "Energy-aware gas sensing using wireless sensor networks." European Conference on Wireless Sensor Networks. Springer, Berlin, Heidelberg, Feb. 2012, 16 pages.

* cited by examiner

TOTAL CRUDE OIL DEMAND CONTROL FROM MULTIPLE OIL STABILIZER COLUMNS

TECHNICAL FIELD

The present disclosure applies to processes used at crude oil processing facilities.

BACKGROUND

Oil stabilizer columns are used to process sour crude into sweet crude in a crude oil processing facility. Each stabilizer column operates independently and transfers the processed sweet crude to the crude oil header by column bottom pumps. The total oil demand in the header is required to be maintained at all times. However, the total oil demand can fluctuate in situations in which process upsets occur due to the independent operation of each stabilizer column. When this occurs, operator action is required to restore the crude oil demand back to normal. The operator action can take time and is subject to human error, which may result in multiple trips.

SUMMARY

The present disclosure describes techniques used in a process control strategy to control the crude oil demand from multiple oil stabilizer columns. In some implementations, a computer-implemented method includes the following. Real-time process data is received for a crude oil processing plant. The real-time process data includes quantitative values for conditions and operations at the crude oil processing plant. A multiple stabilizer oil flow control strategy is determined for a plurality of crude oil stabilizer columns of the crude oil processing plant using the real-time process data. A targeted oil flow rate is determined for each stabilizer column of the plurality of crude oil stabilizer columns of the crude oil processing plant using the multiple stabilizer oil flow control strategy. The targeted oil flow rate provides a continuous and on-target crude oil supply to components of the crude oil processing plant in multiple operating scenarios of the crude oil processing plant. The on-target crude oil supply includes a range of oil flow volumes required for continuous operation. The crude oil processing plant is operated using the multiple stabilizer oil flow control strategy, including maintaining, using the targeted oil flow rate for each stabilizer column of the plurality of crude oil stabilizer columns of the crude oil processing plant, crude oil demand for different combinations of the plurality of crude oil stabilizer columns during the multiple operating scenarios.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Multiple crude oil stabilizer columns can operate independently and can use bottom pumps to transfer sweet crude to the crude oil header. This helps to solve the problem that can occur due to a lack of coordination among the columns. The lack of coordination can cause the crude oil supply to drop in cases in which one or multiple bottom pumps are tripped, requiring operator action to restore the supply. Operator action can be time-consuming and is subject to human error that may cause other upsets in the process. The techniques of the present disclosure can ensure that all stabilizer columns are integrated under a common control strategy. Doing so can maintain the crude oil demand for all combinations of stabilizer columns during all operating conditions including process upsets. The techniques can be used to continuously update the loading of each stabilizer column, enabling an automatic quick action to restore the demand if one or multiple bottom pumps are tripped.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques used in a process control strategy to control the crude oil demand from multiple oil stabilizer columns. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure can be used to integrate multiple crude oil stabilizer columns across a plant under a common control strategy. The common control strategy can enable the plant to maintain the crude oil demand for all combinations of stabilizer columns during all operating conditions, including the process upsets. In case of a minor process upset, all available stabilizer columns can automatically ramp up according to their ramping capabilities to provide a smooth response to keep the crude demand on target. This can occur while maintaining all the columns within the acceptable operating limits of feed flow rate, differential pressure, bottom temperature, and level of the column. During a major process upset (e.g., caused by the tripping of multiple bottom pumps), ramping up of the available stabilizer columns is not sufficient. In this case, the process control strategy automatically starts the standby stabilizer bottom pump(s) to keep the required crude oil demand on target.

Techniques of the present disclosure can include the use of real-time process data (e.g., including crude oil feed flow, column differential pressure, column bottom temperature, and column level) to develop a control strategy that includes a dynamic load allocation function, a disturbance function, and a crude demand controller. An objective of the entire control strategy is to determine the correct load for each stabilizer column for a continuous and on-target crude oil supply in all operating scenarios.

Figure 1:
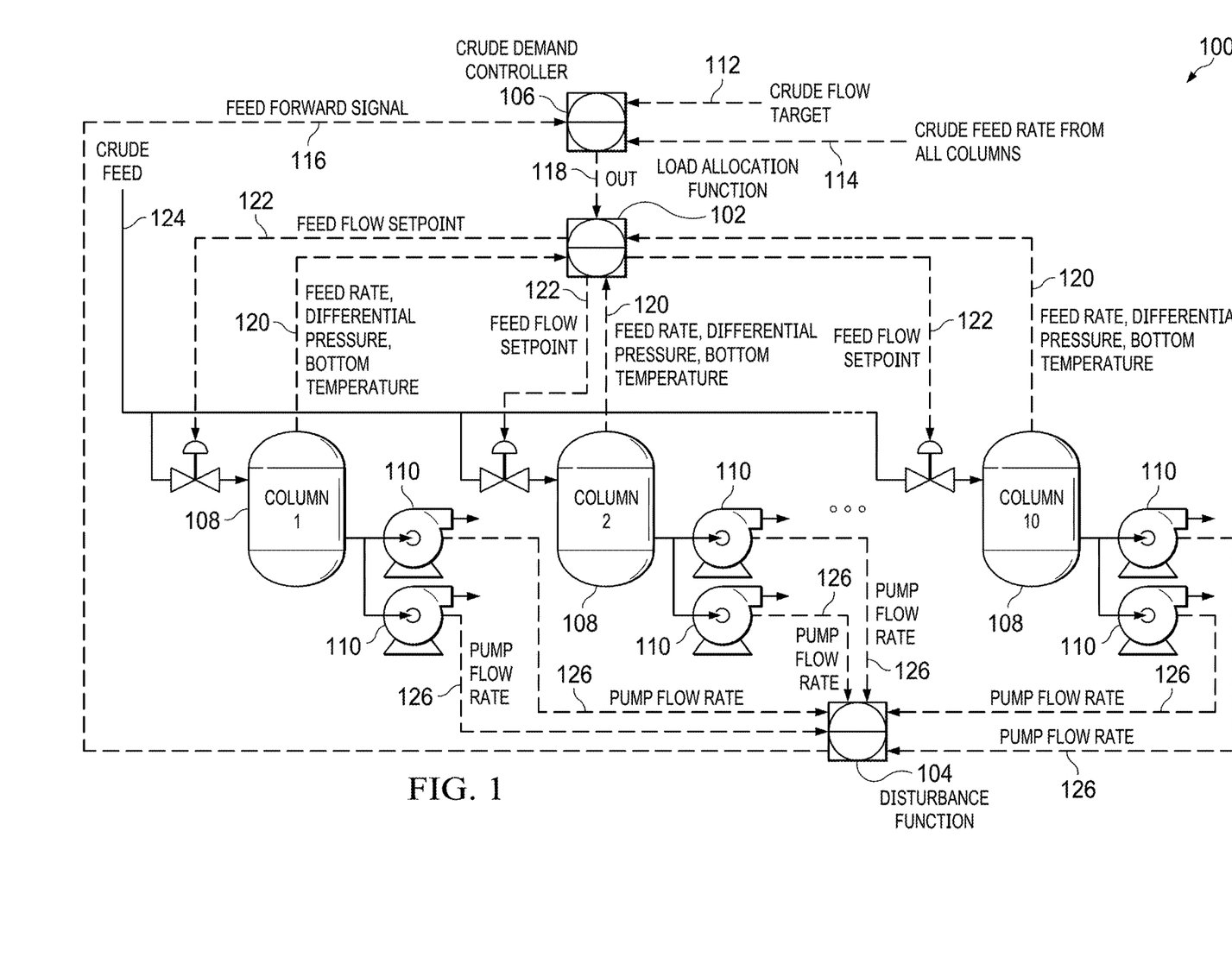
FIG. 1 is a diagram showing examples of elements of a crude oil stabilizer plant using a control strategy, according to some implementations of the present disclosure.

FIG. 1 is a diagram showing examples of elements of a crude oil stabilizer plant 100 using a control strategy, according to some implementations of the present disclosure. As shown in FIG. 1, the crude oil stabilizer plant includes ten stabilizer columns 108 (Column 1 to Column 10) with two bottom pumps 110 per column. The crude oil stabilizer plant 100 also includes three functional components of the innovation: a Load Allocation Function 102, a Disturbance Function 104, and a Crude Demand Controller 106.

The Crude Demand Controller 106 uses, as input, a crude flow target 112, a crude feed rate from all columns 114, and a feed forward signal 116. The Crude Demand Controller 106 produces an output 118 that is an input to the Load Allocation Function 102.

The Load Allocation Function 102 uses inputs 120 from the stabilizer columns 108, including a feed rate, a differential pressure, and a bottom temperature. The Load Allocation Function 102 produces a feed flow setpoint 122 for a crude feed 124 for each of the columns 108.

The Disturbance Function 104 uses pump flow rates 126 from each of the two bottom pumps 110 per column to set the feed forward signal 116.

Load Allocation Function

Figure 2:
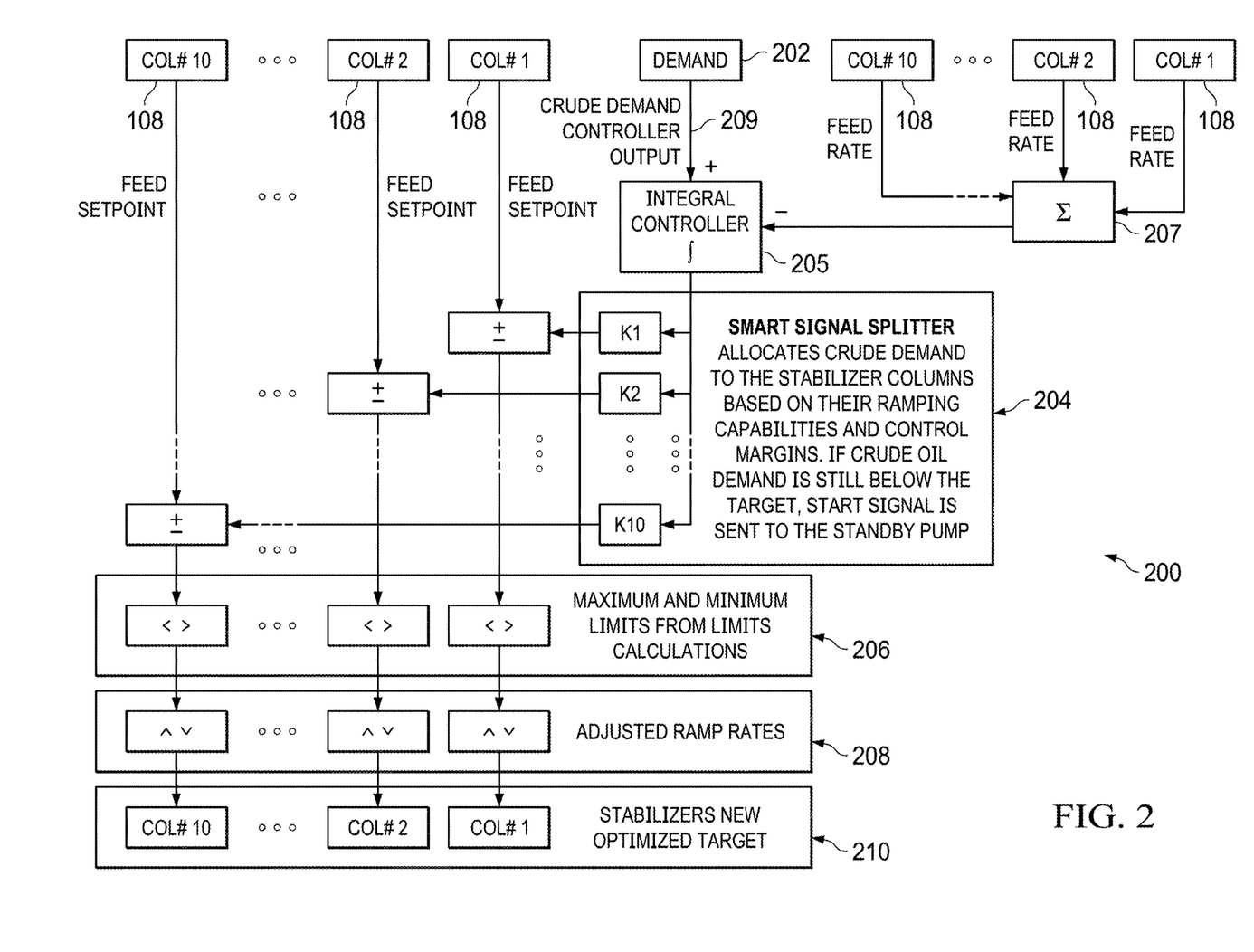
FIG. 2 is a diagram showing an example of a load allocation function, according to some implementations of the present disclosure.

FIG. 2 is a diagram showing an example of a load allocation function 200, according to some implementations of the present disclosure. For example, the Load Allocation Function 102 can split the Total Crude Demand 202 among the stabilizer columns 108 (e.g., using a smart signal splitter 204). The Load Allocation Function 102 continuously determines the targets for the individual column loads. The main objective is to keep the columns within the constraints (pressure, flow, temperature, and level) limits, capable of responding to increasing or decreasing crude demand. The function considers all the stabilizer columns limits as discussed in the Load Limit Calculation section, making sure that all the columns are capable of responding together to large process upsets in crude demand. At a high level, the smart signal splitter 204 can allocate crude demand K1 to K10 to the stabilizer columns based on their ramping capabilities and control margins. If crude oil demand is still below the target, a start signal is sent to the standby pump.

The Load Allocation Function 102 can also maintain sufficient control margins making all the columns capable of responding together to a single or multiple bottom pump/pumps trip. FIG. 2 shows the details of the Load Allocation Function 102. In some implementations, the Load Allocation Function 102 can include at least the following three components.

An Integral-Only Controller 205 can be used for balancing in crude oil flows and also makes the crude demand controller behavior independent of the number of stabilizer columns available to control. The Integral-Only Controller 205 can be fed a sum 207 of individual column 108 (e.g., Columns 1 to 10) loads and the output 209 from the Total Crude Demand 202.

A Smart Signal Splitter can use the total spare capacity and splits the total load to the individual stabilizers based on a spare capacity and ramping capability. The total spare capacity can be determined based on the sum of individual columns' spare capacities. The Smart Signal Splitter can allocate the calculated adjustments to the individual stabilizers' load targets. The Smart Signal Splitter can also ensure that the stabilizer columns are operating within the normal operating limits of process constraints (pressure, flow, temperature, and level).

Load Limit Calculations can be used to determine the operating envelope of the stabilizer column, based on the bottom pump status information, operating steam ratio setpoint and the design data for each column.

Maximum and minimum limits from limits calculations 206 can include a stabilizer minimum and maximum control, calculated as follows:

$$Q_{MAX} = K_{MAX} * F_D * \frac{G_{RUNNING}}{G_{TOTAL}} * \frac{125}{SR_{SP}} \quad (1)$$

$$Q_{MIN} = K_{MIN} * F_D * \frac{G_{RUNNING}}{G_{TOTAL}} * \frac{12.5}{SR_{SP}} \quad (2)$$

Where $Q_{MAX}$ is a maximum crude oil flow rate, $Q_{MIN}$ is a minimum crude oil flow rate, $K_{MAX}$ is a constant (e.g., 0.80 to 0.90), $K_{MIN}$ is a constant (e.g., 0.65 to 0.75), $F_D$ is a crude oil design flow rate, $G_{RUNNING}$ is a number of bottom pumps running, $G_{TOTAL}$ is a total number of pumps, and $SR_{SP}$ is a steam injection ratio setpoint (e.g., 14.5, 13.5, or 12.5, where the steam ratios are for deep, moderate, and shallow stabilization, respectively).

Ramp Rate Adjustments 208, associated with a ramping function in engineering units/second, can be used to adjust the ramp rates of individual column targets. Then a stabilizers new optimized target 210 can be sent to individual stabilizers. An optimized load target can refer, for example, to a load target that achieves values that indicate or result in a performance greater than a predefined threshold.

Disturbance Function

Figure 3:
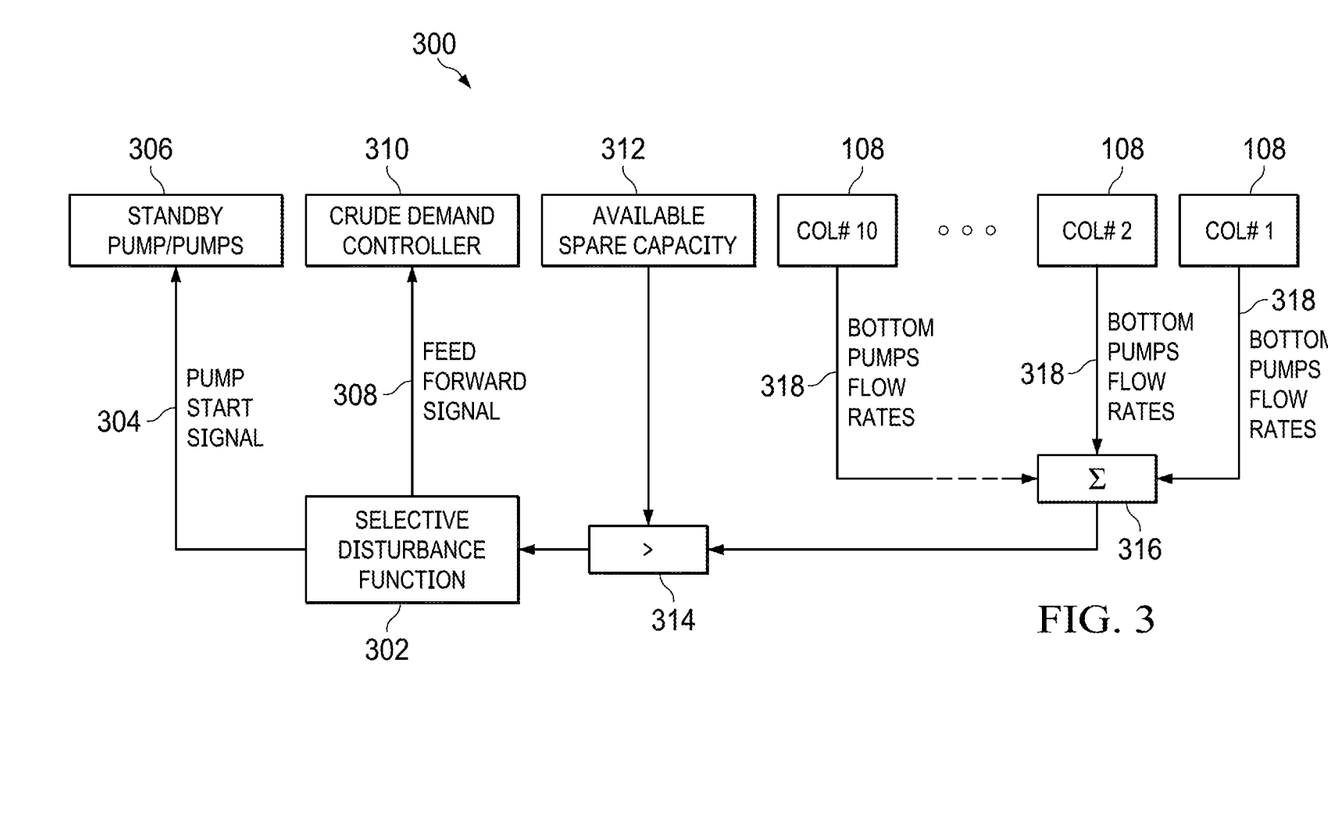
FIG. 3 is a diagram showing example elements of a disturbance function, according to some implementations of the present disclosure.

FIG. 3 is a diagram showing example elements 300 of a disturbance function, according to some implementations of the present disclosure. For example, a function of a Selective Disturbance Function 302 is to provide a timely response (e.g., a start pump signal 304) to the bottom pump/pumps trips for standby pumps 306. The Selective Disturbance Function 302 can use feed forward action 308 to quickly increase output of the crude demand controller 310. Due to increase Crude Demand Controller 310 output, the load allocation function ramps up all available stabilizer columns according to their ramping capabilities and Available Spare Capacities 312. The Selective Disturbance Function 302 can use an input 314 from the Available Spare Capacities 312 that is based on a sum 316 of bottom pump flow rates 318 of the columns 108

The feedforward strategy is used selectively. If it is determined that the stabilizers spare capacity is sufficient to respond to a process upset, the standby pump 304 is not started and the feedforward signal is sent to the Crude Demand Controller 310 to ramp up the loads of the stabilizers. If it is determined that the stabilizers spare capacity is not sufficient, a start command is sent to the standby transfer pump or pumps after increasing the load of the corresponding stabilizer and no feedforward signal is sent to crude demand controller in this case. The purpose of automatically starting the standby pump is to quickly recover the lost crude supply.

Crude Demand Controller

Figure 4:
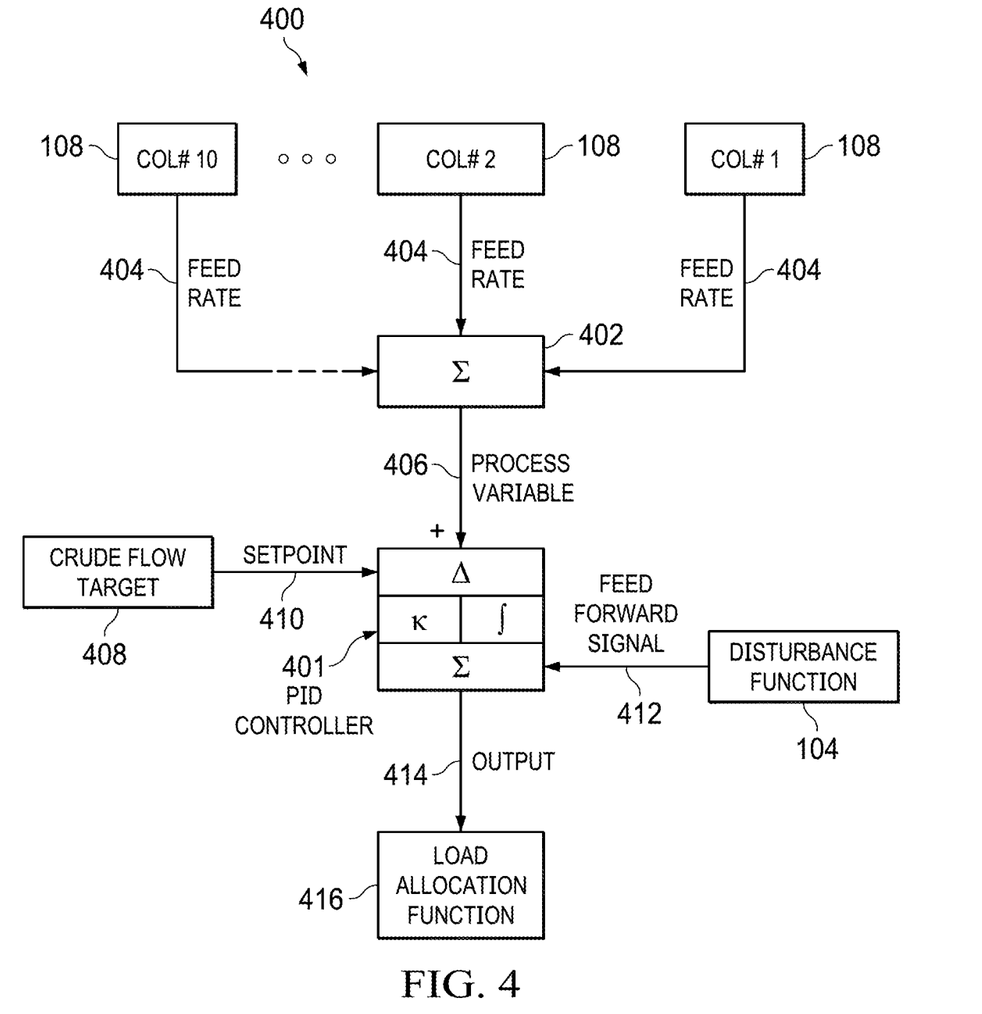
FIG. 4 is a diagram showing example elements of a crude demand controller, according to some implementations of the present disclosure.

FIG. 4 is a diagram showing example elements of a Crude Demand Controller 400, according to some implementations of the present disclosure. For example, the Crude Demand Controller 400 can be the Crude Demand Controller 106. The Crude Demand Controller 400 can include a proportional, integral, and derivative (PID) controller 401 which receives a sum 402 of 1) the feed rate 404 from all the columns as its process variable (PV) 406, and 2) a crude oil target 408 (entered by, for example, a control room operator) as its setpoint 410. The Crude Demand Controller 106 can also receive a feedforward signal 412 from the Disturbance Function 104 as its disturbance variable (DV) input. This controller generates an output signal 414 which is used by Load Allocation Function 416 to adjust the targets of individual stabilizer columns.

Figure 5:
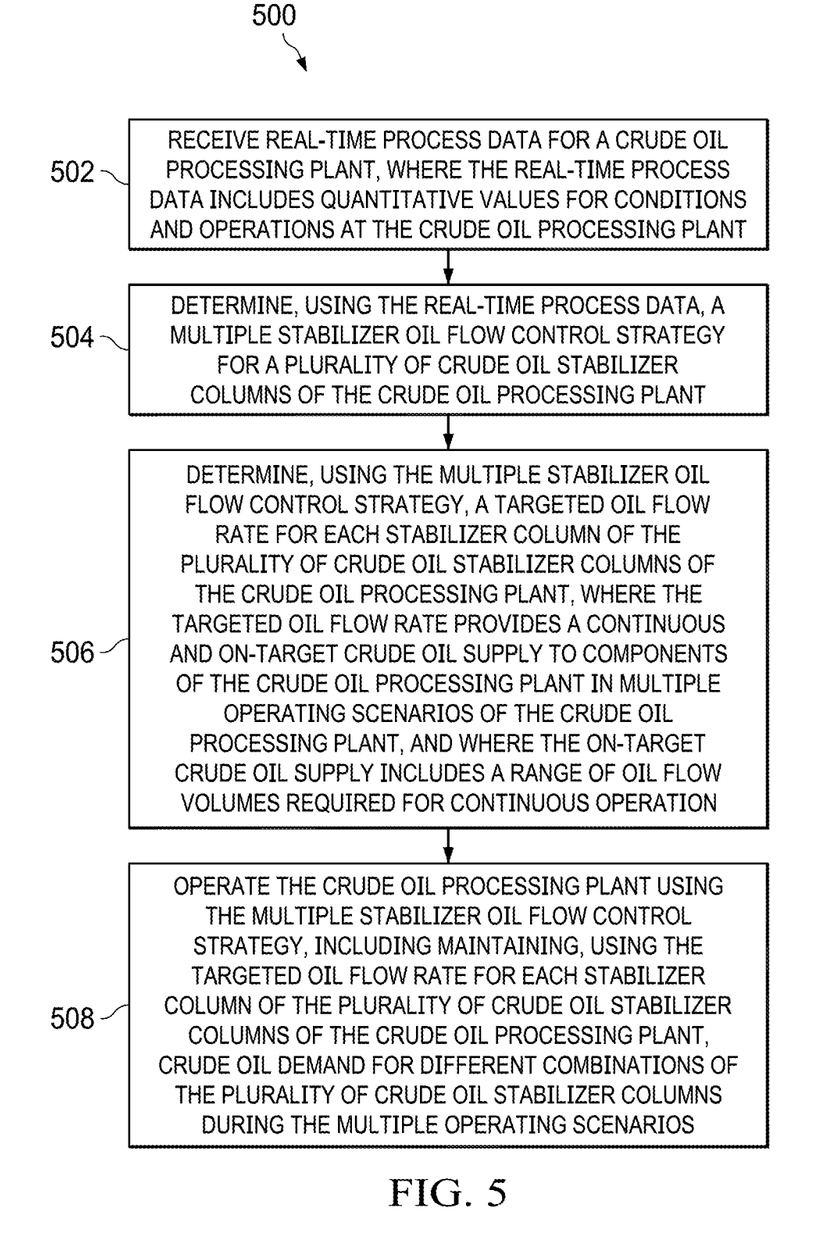
FIG. 5 is a flowchart of an example of a method for maintaining crude oil demand for different combinations of stabilizer columns at a crude oil processing plant during multiple operating scenarios using a multiple stabilizer oil flow control strategy, according to some implementations of the present disclosure.

FIG. 5 is a flowchart of an example of a method 500 for maintaining crude oil demand for different combinations of stabilizer columns at a crude oil processing plant during multiple operating scenarios using a multiple stabilizer oil flow control strategy, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, real-time process data is received for a crude oil processing plant. The real-time process data includes quantitative values for conditions and operations at the crude oil processing plant. The real-time process data can include, for example, a crude oil fee flow, a column differential pressure, a column bottom temperature, and a column level at different times. From 502, method 500 proceeds to 504.

At 504, a multiple stabilizer oil flow control strategy is determined for a plurality of crude oil stabilizer columns of the crude oil processing plant using the real-time process data. As an example, the multiple stabilizer oil flow control strategy for the crude oil processing plant can include a dynamic oil-flow load allocation function, a disturbance function, and a crude demand controller, as described with reference to FIG. 1. From 504, method 500 proceeds to 506.

At 506, a targeted oil flow rate is determined for each stabilizer column of the plurality of crude oil stabilizer columns of the crude oil processing plant using the multiple stabilizer oil flow control strategy. The targeted oil flow rate can provide a continuous and on-target crude oil supply to components of the crude oil processing plant in multiple operating scenarios of the crude oil processing plant. The on-target crude oil supply can include a range of oil flow volumes required for continuous operation. From 506, method 500 proceeds to 508.

At 508, the crude oil processing plant is operated using the multiple stabilizer oil flow control strategy, including maintaining crude oil demand for different combinations of the plurality of crude oil stabilizer columns is maintained during the multiple operating scenarios using the multiple stabilizer oil flow control strategy and the targeted oil flow rate for each stabilizer column of the plurality of crude oil stabilizer columns of the crude oil processing plant. For example, as described with reference to FIG. 1, maintaining the crude oil demand for the different combinations of the plurality of crude oil stabilizer columns during the multiple operating scenarios of the crude oil processing plant can include processing, by a crude demand controller, a crude flow target for each stabilizer column, a crude feed rate for each stabilizer column, and a feed forward signal.

In some implementations, operating the crude oil processing plant using the multiple stabilizer oil flow control strategy includes techniques for handling minor and major process upsets. For example, an occurrence of a minor process upset at the crude oil processing plant can be determined. Then, the available stabilizer columns can be ramped up according to their ramping capabilities to provide a smooth response to keep the crude oil demand on target while maintaining the plurality of crude oil stabilizer columns within predetermined ranges of operating limits of feed flow rate, differential pressure, bottom temperature, and level of each stabilizer column.

In another example, an occurrence of a major process upset at the crude oil processing plant can be determined. One or more standby stabilizer bottom pumps can be automatically started to keep the crude oil demand on target. Determining the occurrence of the major process upset at the crude oil processing plant can include detecting an occurrence of tripping of multiple bottom pumps at the crude oil processing plant. After 518, method 500 can stop.

In some implementations, in addition to (or in combination with) any previously-described features, techniques of the present disclosure can include the following. Customized user interfaces can present intermediate or final results of the above described processes to a user. The presented information can include suggestions, such as suggested changes in parameters or processing inputs, that the user can select to implement improvements in a production environment, such as in the exploration, production, and/or testing of petrochemical processes or facilities. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. For example, outputs of the present disclosure can be used as inputs to other equipment and/or systems at a facility.

Figure 6:
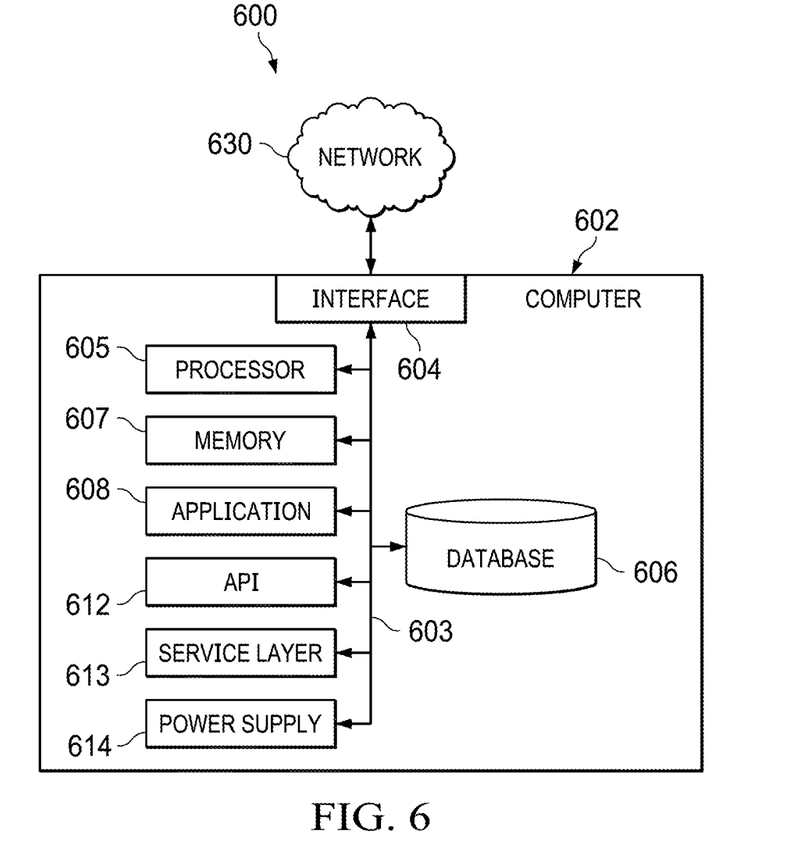
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. Real-time process data is received for a crude oil processing plant. The real-time process data includes quantitative values for conditions and operations at the crude oil processing plant. A multiple stabilizer oil flow control strategy is determined for a plurality of crude oil stabilizer columns of the crude oil processing plant using the real-time process data. A targeted oil flow rate is determined for each stabilizer column of the plurality of crude oil stabilizer columns of the crude oil processing plant using the multiple stabilizer oil flow control strategy. The targeted oil flow rate provides a continuous and on-target crude oil supply to components of the crude oil processing plant in multiple operating scenarios of the crude oil processing plant. The on-target crude oil supply includes a range of oil flow volumes required for continuous operation. The crude oil processing plant is operated using the multiple stabilizer oil flow control strategy, including maintaining, using the targeted oil flow rate for each stabilizer column of the plurality of crude oil stabilizer columns of the crude oil processing plant, crude oil demand for different combinations of the plurality of crude oil stabilizer columns during the multiple operating scenarios.

The foregoing and other described implementations can each, optionally, include one or more of the following features:

A first feature, combinable with any of the following features, where the real-time process data includes a crude oil fee flow, a column differential pressure, a column bottom temperature, and a column level at different times.

A second feature, combinable with any of the previous or following features, where the multiple stabilizer oil flow control strategy for the crude oil processing plant includes a dynamic oil-flow load allocation function, a disturbance function, and a crude demand controller.

A third feature, combinable with any of the previous or following features, where operating the crude oil processing plant using the multiple stabilizer oil flow control strategy includes: determining an occurrence of a minor process upset at the crude oil processing plant; and ramping up available stabilizer columns according to their ramping capabilities to provide a smooth response to keep the crude oil demand on target while maintaining the plurality of crude oil stabilizer columns within predetermined ranges of operating limits of feed flow rate, differential pressure, bottom temperature, and level of each stabilizer column.

A fourth feature, combinable with any of the previous or following features, where operating the crude oil processing plant using the multiple stabilizer oil flow control strategy includes: determining an occurrence of a major process upset at the crude oil processing plant; and automatically starting one or more standby stabilizer bottom pumps to keep the crude oil demand on target.

A fifth feature, combinable with any of the previous or following features, where determining the occurrence of the major process upset at the crude oil processing plant includes detecting an occurrence of tripping of multiple bottom pumps at the crude oil processing plant.

A sixth feature, combinable with any of the previous or following features, where maintaining the crude oil demand for the different combinations of the plurality of crude oil stabilizer columns during the multiple operating scenarios of the crude oil processing plant includes processing, by a crude demand controller, a crude flow target for each stabilizer column, a crude feed rate for each stabilizer column, and a feed forward signal.

In a second implementation, a non-transitory, computer-readable medium stores one or more instructions executable by a computer system to perform operations including the following. Real-time process data is received for a crude oil processing plant. The real-time process data includes quantitative values for conditions and operations at the crude oil processing plant. A multiple stabilizer oil flow control strategy is determined for a plurality of crude oil stabilizer columns of the crude oil processing plant using the real-time process data. A targeted oil flow rate is determined for each stabilizer column of the plurality of crude oil stabilizer columns of the crude oil processing plant using the multiple stabilizer oil flow control strategy. The targeted oil flow rate provides a continuous and on-target crude oil supply to components of the crude oil processing plant in multiple operating scenarios of the crude oil processing plant. The on-target crude oil supply includes a range of oil flow volumes required for continuous operation. The crude oil processing plant is operated using the multiple stabilizer oil flow control strategy, including maintaining, using the targeted oil flow rate for each stabilizer column of the plurality of crude oil stabilizer columns of the crude oil processing plant, crude oil demand for different combinations of the plurality of crude oil stabilizer columns during the multiple operating scenarios.

The foregoing and other described implementations can each, optionally, include one or more of the following features:

A first feature, combinable with any of the following features, where the real-time process data includes a crude oil fee flow, a column differential pressure, a column bottom temperature, and a column level at different times.

A second feature, combinable with any of the previous or following features, where the multiple stabilizer oil flow control strategy for the crude oil processing plant includes a dynamic oil-flow load allocation function, a disturbance function, and a crude demand controller.

A third feature, combinable with any of the previous or following features, where operating the crude oil processing plant using the multiple stabilizer oil flow control strategy includes: determining an occurrence of a minor process upset at the crude oil processing plant; and ramping up available stabilizer columns according to their ramping capabilities to provide a smooth response to keep the crude oil demand on target while maintaining the plurality of crude oil stabilizer columns within predetermined ranges of operating limits of feed flow rate, differential pressure, bottom temperature, and level of each stabilizer column.

A fourth feature, combinable with any of the previous or following features, where operating the crude oil processing plant using the multiple stabilizer oil flow control strategy includes: determining an occurrence of a major process upset at the crude oil processing plant; and automatically starting one or more standby stabilizer bottom pumps to keep the crude oil demand on target.

A fifth feature, combinable with any of the previous or following features, where determining the occurrence of the major process upset at the crude oil processing plant includes detecting an occurrence of tripping of multiple bottom pumps at the crude oil processing plant.

A sixth feature, combinable with any of the previous or following features, where maintaining the crude oil demand for the different combinations of the plurality of crude oil stabilizer columns during the multiple operating scenarios of the crude oil processing plant includes processing, by a crude demand controller, a crude flow target for each stabilizer column, a crude feed rate for each stabilizer column, and a feed forward signal.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Real-time process data is received for a crude oil processing plant. The real-time process data includes quantitative values for conditions and operations at the crude oil processing plant. A multiple stabilizer oil flow control strategy is determined for a plurality of crude oil stabilizer columns of the crude oil processing plant using the real-time process data. A targeted oil flow rate is determined for each stabilizer column of the plurality of crude oil stabilizer columns of the crude oil processing plant using the multiple stabilizer oil flow control strategy. The targeted oil flow rate provides a continuous and on-target crude oil supply to components of the crude oil processing plant in multiple operating scenarios of the crude oil processing plant. The on-target crude oil supply includes a range of oil flow volumes required for continuous operation. The crude oil processing plant is operated using the multiple stabilizer oil flow control strategy, including maintaining, using the targeted oil flow rate for each stabilizer column of the plurality of crude oil stabilizer columns of the crude oil processing plant, crude oil demand for different combinations of the plurality of crude oil stabilizer columns during the multiple operating scenarios.

The foregoing and other described implementations can each, optionally, include one or more of the following features:

A first feature, combinable with any of the following features, where the real-time process data includes a crude oil fee flow, a column differential pressure, a column bottom temperature, and a column level at different times.

A second feature, combinable with any of the previous or following features, where the multiple stabilizer oil flow control strategy for the crude oil processing plant includes a dynamic oil-flow load allocation function, a disturbance function, and a crude demand controller.

A third feature, combinable with any of the previous or following features, where operating the crude oil processing plant using the multiple stabilizer oil flow control strategy includes: determining an occurrence of a minor process upset at the crude oil processing plant; and ramping up available stabilizer columns according to their ramping capabilities to provide a smooth response to keep the crude oil demand on target while maintaining the plurality of crude oil stabilizer columns within predetermined ranges of operating limits of feed flow rate, differential pressure, bottom temperature, and level of each stabilizer column.

A fourth feature, combinable with any of the previous or following features, where operating the crude oil processing plant using the multiple stabilizer oil flow control strategy includes: determining an occurrence of a major process upset at the crude oil processing plant; and automatically starting one or more standby stabilizer bottom pumps to keep the crude oil demand on target.

A fifth feature, combinable with any of the previous or following features, where determining the occurrence of the major process upset at the crude oil processing plant includes detecting an occurrence of tripping of multiple bottom pumps at the crude oil processing plant.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving real-time process data for a crude oil processing plant, wherein the real-time process data includes quantitative values for conditions and operations at the crude oil processing plant;
determining, using the real-time process data, a multiple stabilizer oil flow control strategy for a plurality of crude oil stabilizer columns of the crude oil processing plant, wherein the multiple stabilizer oil flow control strategy for the crude oil processing plant comprises a dynamic oil-flow load allocation function, a disturbance function, and a crude demand controller;
determining, using the multiple stabilizer oil flow control strategy, a targeted oil flow rate for each stabilizer column of the plurality of crude oil stabilizer columns of the crude oil processing plant, wherein the targeted oil flow rate provides a continuous and on-target crude oil supply to components of the crude oil processing plant in multiple operating scenarios of the crude oil processing plant, and wherein the on-target crude oil supply comprises a range of oil flow volumes required for continuous operation; and
operating the crude oil processing plant using the multiple stabilizer oil flow control strategy, comprising maintaining, using the targeted oil flow rate for each stabilizer column of the plurality of crude oil stabilizer columns of the crude oil processing plant, crude oil demand for different combinations of the plurality of crude oil stabilizer columns during the multiple operating scenarios.

2. The computer-implemented method of claim 1, wherein the real-time process data comprises a crude oil fee flow, a column differential pressure, a column bottom temperature, and a column level at different times.

3. The computer-implemented method of claim 1, wherein the dynamic oil-flow load allocation function processes a feed rate, a differential pressure, and a bottom temperature, generated by the crude demand controller, to produce a feed flow setpoint.

4. The computer-implemented method of claim 1, wherein operating the crude oil processing plant using the multiple stabilizer oil flow control strategy comprises:
    determining an occurrence of a minor process upset at the crude oil processing plant; and
    ramping up available stabilizer columns according to their ramping capabilities to provide a smooth response to keep the crude oil demand on target while maintaining the plurality of crude oil stabilizer columns within predetermined ranges of operating limits of feed flow rate, differential pressure, bottom temperature, and level of each stabilizer column.

5. The computer-implemented method of claim 1, wherein operating the crude oil processing plant using the multiple stabilizer oil flow control strategy comprises:
    determining an occurrence of a major process upset at the crude oil processing plant; and
    automatically starting one or more standby stabilizer bottom pumps to keep the crude oil demand on target.

6. The computer-implemented method of claim 5, wherein determining the occurrence of the major process upset at the crude oil processing plant comprises detecting an occurrence of tripping of multiple bottom pumps at the crude oil processing plant.

7. The computer-implemented method of claim 1, wherein maintaining the crude oil demand for the different combinations of the plurality of crude oil stabilizer columns during the multiple operating scenarios of the crude oil processing plant comprises processing, by a crude demand controller, a crude flow target for each stabilizer column, a crude feed rate for each stabilizer column, and a feed forward signal.

8. A non-transitory, computer-readable medium storing one or more instructions executable by a computer system to perform operations comprising:
    receiving real-time process data for a crude oil processing plant, wherein the real-time process data comprises quantitative values for conditions and operations at the crude oil processing plant;
    determining, using the real-time process data, a multiple stabilizer oil flow control strategy for a plurality of crude oil stabilizer columns of the crude oil processing plant, wherein the multiple stabilizer oil flow control strategy for the crude oil processing plant comprises a dynamic oil-flow load allocation function, a disturbance function, and a crude demand controller;
    determining, using the multiple stabilizer oil flow control strategy, a targeted oil flow rate for each stabilizer column of the plurality of crude oil stabilizer columns of the crude oil processing plant, wherein the targeted oil flow rate provides a continuous and on-target crude oil supply to components of the crude oil processing plant in multiple operating scenarios of the crude oil processing plant, and wherein the on-target crude oil supply comprises a range of oil flow volumes required for continuous operation; and
    operating the crude oil processing plant using the multiple stabilizer oil flow control strategy, comprising maintaining, using the targeted oil flow rate for each stabilizer column of the plurality of crude oil stabilizer columns of the crude oil processing plant, crude oil demand for different combinations of the plurality of crude oil stabilizer columns during the multiple operating scenarios.

9. The non-transitory, computer-readable medium of claim 8, wherein the real-time process data comprises a crude oil fee flow, a column differential pressure, a column bottom temperature, and a column level at different times.

10. The non-transitory, computer-readable medium of claim 8, wherein the dynamic oil-flow load allocation function processes a feed rate, a differential pressure, and a bottom temperature, generated by the crude demand controller, to produce a feed flow setpoint.

11. The non-transitory, computer-readable medium of claim 8, wherein operating the crude oil processing plant using the multiple stabilizer oil flow control strategy comprises:
    determining an occurrence of a minor process upset at the crude oil processing plant; and
    ramping up available stabilizer columns according to their ramping capabilities to provide a smooth response to keep the crude oil demand on target while maintaining the plurality of crude oil stabilizer columns within predetermined ranges of operating limits of feed flow rate, differential pressure, bottom temperature, and level of each stabilizer column.

12. The non-transitory, computer-readable medium of claim 8, wherein operating the crude oil processing plant using the multiple stabilizer oil flow control strategy comprises:
    determining an occurrence of a major process upset at the crude oil processing plant; and
    automatically starting one or more standby stabilizer bottom pumps to keep the crude oil demand on target.

13. The non-transitory, computer-readable medium of claim 12, wherein determining the occurrence of the major process upset at the crude oil processing plant comprises detecting an occurrence of tripping of multiple bottom pumps at the crude oil processing plant.

14. The non-transitory, computer-readable medium of claim 8, wherein maintaining the crude oil demand for the different combinations of the plurality of crude oil stabilizer columns during the multiple operating scenarios of the crude oil processing plant comprises processing, by a crude demand controller, a crude flow target for each stabilizer column, a crude feed rate for each stabilizer column, and a feed forward signal.

15. A computer-implemented system, comprising:
    one or more processors; and
    a non-transitory computer-readable storage medium coupled to the one or more processors and storing programming instructions for execution by the one or more processors, the programming instructions instructing the one or more processors to perform operations comprising:
        receiving real-time process data for a crude oil processing plant, wherein the real-time process data comprises quantitative values for conditions and operations at the crude oil processing plant;
        determining, using the real-time process data, a multiple stabilizer oil flow control strategy for a plurality of crude oil stabilizer columns of the crude oil processing plant, wherein the multiple stabilizer oil flow control strategy for the crude oil processing plant comprises a dynamic oil-flow load allocation function, a disturbance function, and a crude demand controller;
        determining, using the multiple stabilizer oil flow control strategy, a targeted oil flow rate for each stabilizer column of the plurality of crude oil stabilizer columns of the crude oil processing plant, wherein the targeted oil flow rate provides a continuous and on-target crude oil supply to components of the crude oil processing plant in multiple operating scenarios of the crude oil processing plant, and wherein the on-target crude oil supply comprises a range of oil flow volumes required for continuous operation; and operating the crude oil processing plant using the multiple stabilizer oil flow control strategy, comprising maintaining, using the targeted oil flow rate for each stabilizer column of the plurality of crude oil stabilizer columns of the crude oil processing plant, crude oil demand for different combinations of the plurality of crude oil stabilizer columns during the multiple operating scenarios.

16. The computer-implemented system of claim 15, wherein the real-time process data comprises a crude oil fee flow, a column differential pressure, a column bottom temperature, and a column level at different times.

17. The computer-implemented system of claim 15, wherein the dynamic oil-flow load allocation function processes a feed rate, a differential pressure, and a bottom temperature, generated by the crude demand controller, to produce a feed flow setpoint.

18. The computer-implemented system of claim 15, wherein operating the crude oil processing plant using the multiple stabilizer oil flow control strategy comprises:

determining an occurrence of a minor process upset at the crude oil processing plant; and ramping up available stabilizer columns according to their ramping capabilities to provide a smooth response to keep the crude oil demand on target while maintaining the plurality of crude oil stabilizer columns within predetermined ranges of operating limits of feed flow rate, differential pressure, bottom temperature, and level of each stabilizer column.

19. The computer-implemented system of claim 15, wherein operating the crude oil processing plant using the multiple stabilizer oil flow control strategy comprises:

determining an occurrence of a major process upset at the crude oil processing plant; and automatically starting one or more standby stabilizer bottom pumps to keep the crude oil demand on target.

20. The computer-implemented system of claim 19, wherein determining the occurrence of the major process upset at the crude oil processing plant comprises detecting an occurrence of tripping of multiple bottom pumps at the crude oil processing plant.

\* \* \* \* \*

UNITED STATES PATENT AND TRADEMARK OFFICE
CERTIFICATE OF CORRECTION

PATENT NO. : 12,297,722 B2
APPLICATION NO. : 17/591722
DATED : May 13, 2025
INVENTOR(S) : Rana Khurram Shahzad, Ali A. Alwadi and Mohammed Al-Saeed Page 1 of 1

It is certified that error appears in the above-identified patent and that said Letters Patent is hereby corrected as shown below:

In the Claims

In Column 16, Line 60, Claim 2, please replace "fee" with -- feed --

In Column 18, Line 1, Claim 9, please replace "fee" with -- feed --

In Column 19, Line 14, Claim 16, please replace "fee" with -- feed --

Signed and Sealed this
First Day of July, 2025

Coke Morgan Stewart
*Acting Director of the United States Patent and Trademark Office*